(12) United States Patent
Olien et al.

(10) Patent No.: US 9,335,822 B2
(45) Date of Patent: May 10, 2016

(54) METHOD AND SYSTEM FOR PROVIDING HAPTIC EFFECTS BASED ON HAPTIC CONTEXT INFORMATION

(71) Applicant: Immersion Corporation, San Jose, CA (US)

(72) Inventors: Neil Olien, Montreal (CA); Michael Greenish, Gryon (CH)

(73) Assignee: Immersion Corporation, San Jose, CA (US)

( * ) Notice: Subject to any disclaimer, the term of this patent is extended or adjusted under 35 U.S.C. 154(b) by 18 days.

(21) Appl. No.: 14/104,441

(22) Filed: Dec. 12, 2013

(65) Prior Publication Data
US 2014/0160050 A1 Jun. 12, 2014

Related U.S. Application Data

(60) Provisional application No. 61/736,384, filed on Dec. 12, 2012, provisional application No. 61/793,252, filed on Mar. 15, 2013.

(51) Int. Cl.
*G06F 3/01* (2006.01)

(52) U.S. Cl.
CPC .................................. *G06F 3/016* (2013.01)

(58) Field of Classification Search
CPC ... G06F 3/016; G06F 3/04842; G06F 3/0482; G06F 3/0488; G06F 3/04817
See application file for complete search history.

(56) References Cited

U.S. PATENT DOCUMENTS

| | | | |
|---|---|---|---|
| 2009/0325645 A1* | 12/2009 | Bang et al. ..................... | 455/566 |
| 2010/0156818 A1* | 6/2010 | Burrough et al. ............. | 345/173 |
| 2010/0231550 A1* | 9/2010 | Cruz-Hernandez et al. .. | 345/174 |
| 2011/0264491 A1 | 10/2011 | Birnbaum et al. | |
| 2011/0304558 A1* | 12/2011 | Pasquero et al. .............. | 345/173 |
| 2014/0168110 A1* | 6/2014 | Araki et al. ................... | 345/173 |
| 2014/0253302 A1* | 9/2014 | Levesque ................ | G06F 3/016 |
| | | | 340/407.1 |

OTHER PUBLICATIONS

Eberhardt et al., Force Reflection for Wimps: A Button Acquisition Experiment, Proceedings of the American Society of Mechanical Engineers (ASME) Dynamic Systems and Control Division, DSC-vol. 61, presented at the 1997 ASME International Mechanical Engineering Congress and Exposition, Nov. 1997.

* cited by examiner

*Primary Examiner* — Lixi C Simpson
(74) *Attorney, Agent, or Firm* — Kilpatrick Townsend & Stockton LLP

(57) ABSTRACT

The present disclosure is generally directed to a method for providing haptic effects based on haptic context data including receiving haptic context information associated with a user interface, receiving an input signal associated with a user interaction with the user interface; and determining a haptic effect based in part on the haptic context information and input signal; and outputting a haptic signal associated with the haptic effect.

24 Claims, 6 Drawing Sheets

| Active Input Control / Active Input Area + Permitted Input Type | Haptic Effect Identification Data |
|---|---|
| 1 | A |
| 2 | B |
| 3 | B |
| 4 | A |
| 5 | C |
| 6 | D |
| 7 | E |
| 8 | B |

FIG. 5A

| Haptic Effect Identification Data | Active Input Control / Active Input Area + Permitted Input Type |
|---|---|
| A | 1 |
|  | 4 |
| B | 2 |
|  | 3 |
|  | 8 |
| C | 5 |
| D | 6 |
| E | 7 |

FIG. 5B

METHOD AND SYSTEM FOR PROVIDING HAPTIC EFFECTS BASED ON HAPTIC CONTEXT INFORMATION

REFERENCE TO RELATED APPLICATION

This application claims priority to U.S. Provisional Patent Application No. 61/736,384, entitled "Method and System for Providing Haptic Context to Touch input Haptic Controller," filed Dec. 12, 2012, and to U.S. Provisional Patent Application No. 61/793,252, entitled "Method and System for Providing Haptic Effects Based on Haptic Context Information," filed Mar. 15, 2013, the entirety of which are hereby incorporated by reference.

FIELD OF THE INVENTION

The present disclosure generally relates to methods and systems for providing haptic effects based on haptic context information, and more particularly to methods and systems for providing haptic effects based on haptic context information provided to an input processor or a haptics processor based on a currently displayed graphical user interface (GUI).

BACKGROUND

Electronics manufacturers strive to produce rich interfaces for users. Conventional devices and systems use visual and auditory cues to provide feedback to a user. In some interface devices and systems, haptic feedback or haptic effects are used and can provide cues that enhance and/or simplify the user interface. Specifically, haptic effects may be useful in providing cues to alert users to specific events, or may provide realistic feedback to create greater sensory immersion within a simulated or virtual environment.

For example, in an automotive setting, haptics provide drivers with tactile feedback that guides users and confirms commands, thereby creating more intuitive interfaces. In addition, haptics can help reduce glance time for improved usability as the driver or passenger interacts with in-vehicle information, entertainment, navigation and/or communication interfaces through touch screens, touch panels, or rotary interfaces. Providing contextual haptic feedback based on the information being viewed simplifies the user experience and makes navigating through automotive information and entertainment systems more intuitive.

SUMMARY

The present disclosure generally relates to a method comprising receiving haptic context information, receiving user input information, and determining a haptic effect to be output based on the haptic context information and user input information. Another embodiment comprises a computer-readable medium encoded with processor-executable software program code for carrying out such a method.

Illustrative embodiments disclosed herein are mentioned not to limit or define the invention, but to provide examples to aid understanding thereof. Illustrative embodiments are discussed in the Detailed Description and further description is provided there. Advantages offered by various embodiments of this invention may be further understood by examining this specification and/or by practicing one or more embodiments of the claimed subject matter.

BRIEF DESCRIPTION OF THE DRAWINGS

These and other features, aspects, and advantages according to the present disclosure are better understood when the following Detailed Description is read with reference to the accompanying figures, wherein:

FIGS. 5A and 5B illustrate data structures according to embodiments of the present disclosure.

DETAILED DESCRIPTION

Figure 1A:
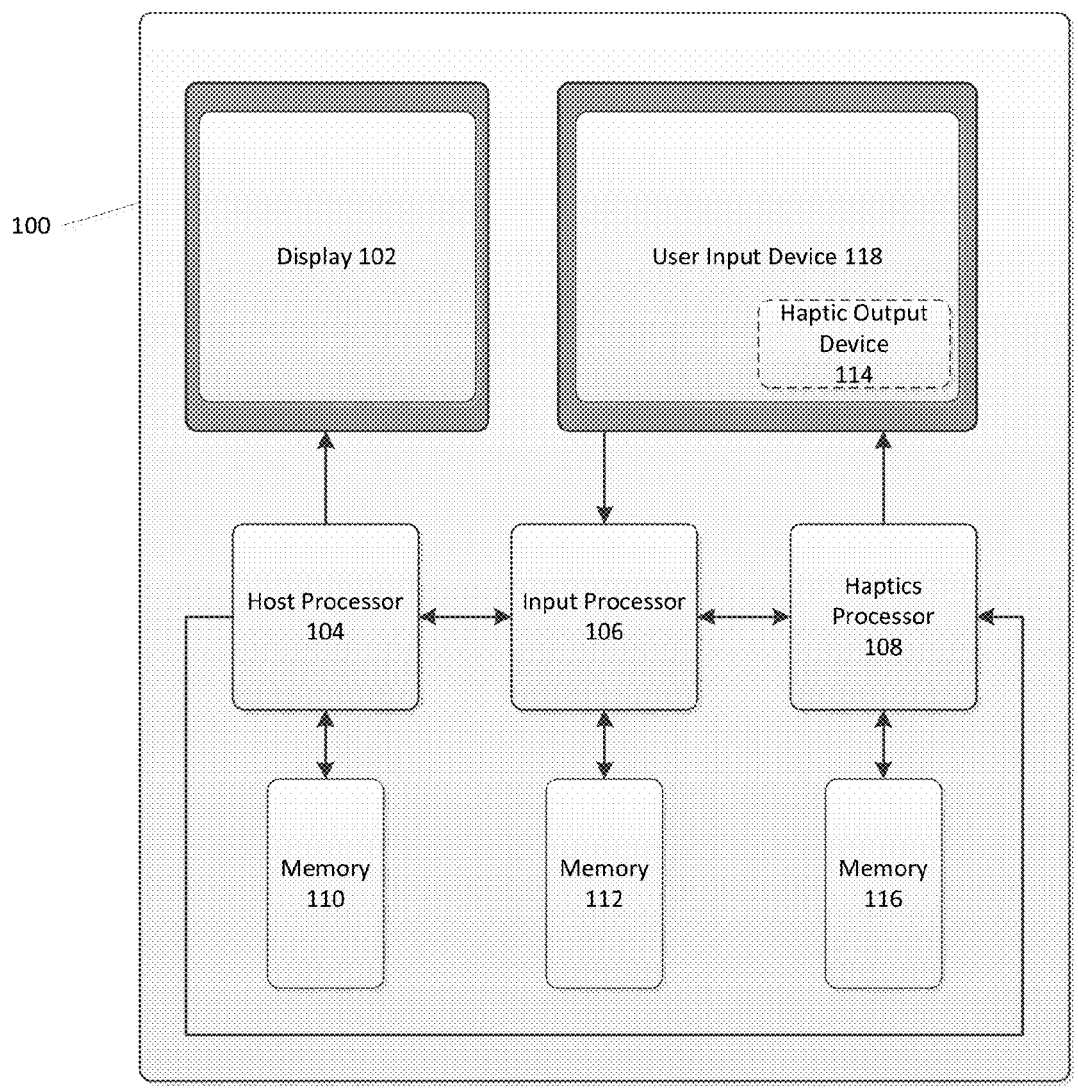
FIGS. 1A and 1B are block system diagrams according to embodiments of the present disclosure.

Embodiments according to this disclosure provide methods and systems for providing haptic effects based on provided haptic context information, and more particularly to methods and systems for providing haptic effects based on haptic context information provided to an input processor or a haptics processor based on a currently displayed graphical user interface (GUI).

Illustrative Embodiment of a Device for Providing Haptic Effects Based on Haptic Context Information In one illustrative embodiment, an automotive information and entertainment system comprises a touch screen for providing a GUI to a user including music controls, navigation controls, and telephone controls. In such an embodiment, a host processor provides the GUI screens to the touch screen for display and provides haptic context information to an input microcontroller unit (MCU). For example, the processor may provide a main menu screen with application icons that a user may tap to launch applications, such as a radio icon and a navigation icon. The processor provides haptic context information, including active input areas of the touch screen corresponding to the displayed main menu screen, permitted types of user input for each active input area, such as taps, drags or other gestures, and haptic effect identification information, identifying effects to be output in response to the permitted types of user input for each active input area. For example, in one embodiment, the haptic context information corresponding to the main menu screen identifies the location of the application icons on the touch screen display as the active input areas, identifies that the permitted input type for each of the active input areas is a tap, and that a pulse vibration is to be output in response to a successful tap within an active input area (i.e. a tap of an application icon).

In such an embodiment, when the user interacts with the touch screen, user input information indicating the location and type of the user input is received by the input MCU. Using the user input information, the input MCU determines if the user input was within an active input area—in this example, the location of an application icon. If so, the MCU determines if the user input was a permitted user input type for the particular active input area—in this example, a tap—based on the haptic context information. For example, when a user taps the navigation application icon, the input MCU will receive user input information indicating the location and type of the user input.

In one such embodiment, based on the haptic context information, the input MCU may determine that the user input was located within an active input area of the display and that the input type was a valid input type. The input MCU may then determine that a pulse vibration is the appropriate haptic effect to be output in response to the user input based on the haptic context information. The input MCU may communicate with a haptics MCU to initiate the playing of the pulse vibration haptic effect. The input MCU may also communicate the user input information to the host processor for further handling of the user input.

Based on the user input information, in such an embodiment, the host processor may determine that the user tapped the navigation application icon. In response, the host processor may provide to the touch screen for display a primary navigation application GUI screen showing a map centered on the location of the automobile and controls around the periphery of the map. Contemporaneously, the host processor may provide haptic context information to the input MCU defining active input areas of the touch screen, including the map area and the peripheral controls, and may provide permitted user input types per active input area (e.g. drag, tap and zoom user inputs for the map area and taps for the peripheral controls). The haptic context information may further define haptic effect identification information associating haptic effects with permitted user input types within one or more of the active input areas (e.g. individual pulse vibration for a tap, a texture effect for a drag, and constant vibration for the duration of a zoom input).

In such an embodiment, when a user touches a finger to the map area and drags it along the screen, the input MCU may receive corresponding user input information. Based on the user input information and the haptic context information, the input MCU may determine that the user input is in an active input area, that the drag user input is a permitted input type for the active input area comprising the map, and that the haptic effect identification information indicates that a texture haptic effect should be output for the duration of the drag. The input MCU may communicate with the haptics MCU to initiate the playing of the texture haptic effect. The input MCU may also communicate the user input information to the host processor. In response, the host processor may provide updated display information to the touch screen to display a new section of the map. However, since the GUI controls, and therefore the active input areas, permitted user input types, and haptic effect identification information all remain the same, the host processor may not provide new haptic context information to the input MCU.

Latency can be a problem in haptic systems when the host processor or controller and haptic player do not reside in the same chip. In some embodiments, a haptic confirmation window that is approximately 50-60 ms may provide a realistic experience for the user. During quick touches, 75 ms may be considered a threshold at which some users will miss experiencing a haptic effect altogether.

GUIs, such as those described above, often have different screens for different functionality. Thus, different haptic effects may be needed depending on the particular GUI screen. The screen shown may be a result of a previous user interaction, such as selecting a navigation screen, and thus a series of different screens may be shown as the user interacts with the GUI to accomplish a particular task. Many host applications have difficulty providing haptic confirmation within a 50-60 ms window when the host processor and a processor dedicated to controlling one or more haptic output devices do not reside in the same chip. Further, in system architectures that use multiple communication buses and multiple devices per bus, it may be difficult for the system to interpret a touch event and trigger an effect within the desired latency window. One solution is to embed a player in the host chip, but this does not resolve the issue with all architectures.

The system described in the illustrative embodiment may minimize this latency issue. Using the host processor to provide haptic context data to the input MCU at the time a new GUI screen is displayed may eliminate reliance on the host processor for determining haptic feedback when the user input is received, and with it a primary source of latency in systems similar to the illustrative embodiment.

This illustrative embodiment is merely an example, and multiple other embodiments of the present invention may be implemented as described herein.

Figure 1B:
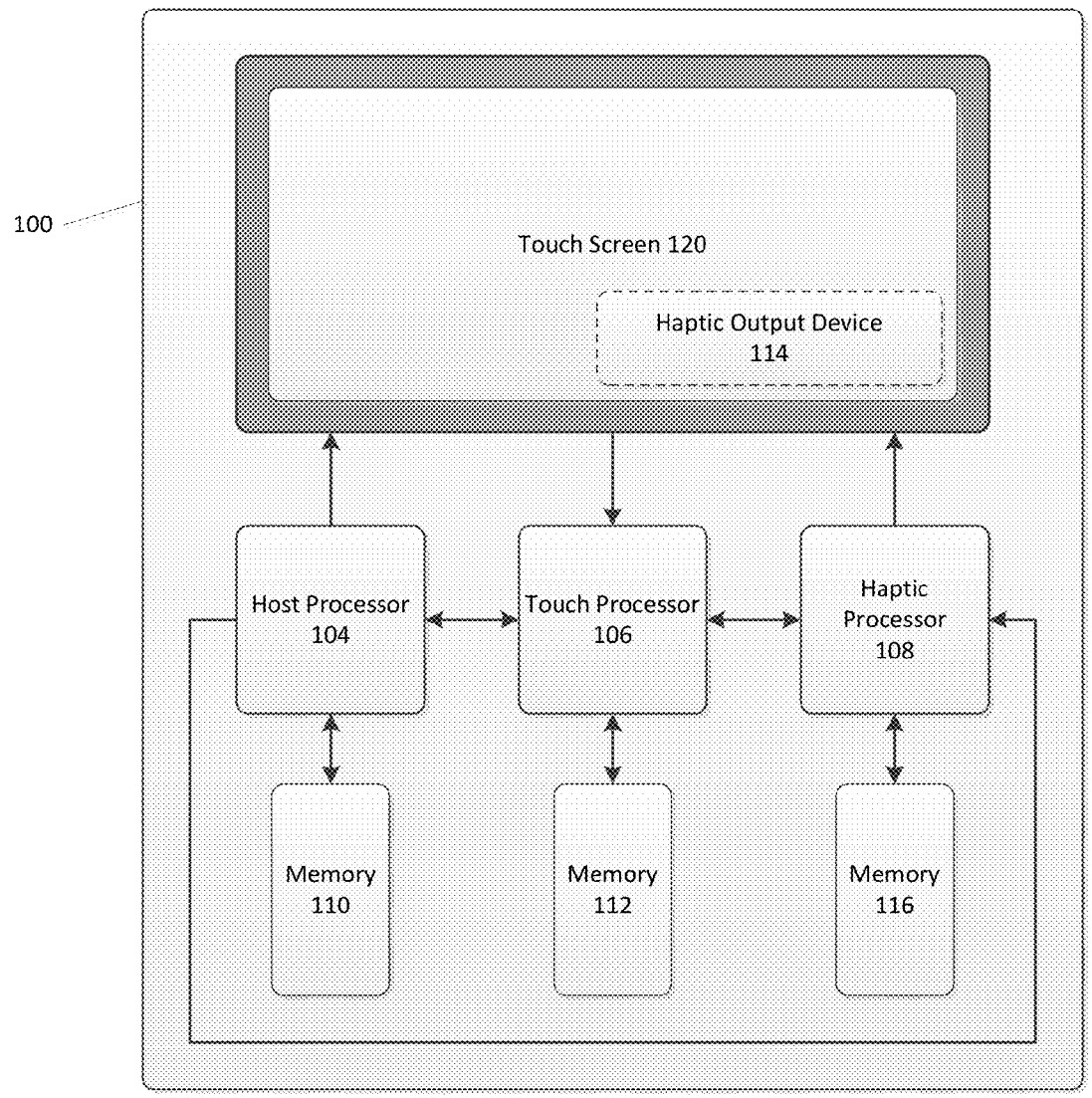

Illustrative System for Providing Haptic Effects Based on Haptic Context Information Referring now to the drawings in which like numerals indicate like elements throughout the several Figures, FIGS. 1A and 1B are block diagrams of a system for providing haptic effects based on provided haptic context information according to embodiments of the present disclosure.

The system 100 illustrated in FIGS. 1A and 1B may be employed in a variety of form factors including an automobile console, an airplane console, a console for industrial equipment, a household appliance, a medical device, a gaming console, a kiosk, a mobile phone, a personal digital assistant (PDA), tablet computer, laptop computer, palmtop computer, a handheld navigation system, or a number of other devices.

Embodiments of the present disclosure may be implemented in combination with, or may comprise combinations of: digital electronic circuitry, computer hardware, firmware, and software. The system 100 shown in FIG. 1A comprises a host processor 104, an input processor 106, and a haptics processor 108. The host processor 104 receives input signals from and/or generates signals for communication with other components, such as input processor 106, haptics processor 108, display 102, and/or memory 110. The host processor 104, input processor 106, and haptics processor 108 include or are each in communication with one or more computer-readable media, such as memory 110, memory 112, and memory 116 respectively, which may comprise random access memory (RAM). In one embodiment, each of the processors 104, 106, and 108 and their respective associated memories 110, 112, and 116 comprise microcontroller units. In another embodiment, input processor 106 and haptics processor 108 comprise a single processor and are in communication with memory 110.

The host processor 104, the input processor 106, and haptics processor 108, may execute computer-executable program instructions stored in memory 110, memory 112, and memory 116, respectively. The host processor 104, input processor 106, and haptics processor 108 may each comprise a microprocessor, a digital signal processor (DSP), an application-specific integrated circuit (ASIC), one or more field programmable gate arrays (FPGAs), or state machines. The processor may further comprise a programmable electronic device such as a PLC, a programmable interrupt controller (PIC), a programmable logic device (PLD), a programmable read-only memory (PROM), an electronically programmable read-only memory (EPROM or EEPROM), or other similar devices.

Memory 110, memory 112, and memory 116 each comprise a computer-readable media that may store instructions, which, when executed by host processor 104, the input processor 106, and haptics processor 108, respectively, cause the respective processor to perform various steps, such as those described herein. Embodiments of computer-readable media may comprise, but are not limited to, an electronic, optical, magnetic, or other storage or transmission device capable of providing the host processor 104, the input processor 106, and haptics processor 108, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The host processor 104, the input processor 106, and haptics processor 108, and the processing described may be in one or more structures, and may be dispersed through one or more structures.

In some embodiments, memory 110, memory 112, and/or memory 116 may further comprise a data store comprising data associated with the parasitic vibrations. For example, in one embodiment, memory 112 may comprise a database of parasitic vibrations associated with various environments, which is accessible by input processor 106. In another embodiment, memory 116 may comprise a database of parasitic vibrations associated with various environments, which is accessible by haptics processor 108.

Referring still to the embodiment described in FIG. 1A, the system 100 comprises one or more user input devices 118. In one embodiment, the user input device 118 is a touch pad. In another embodiment, system 100 comprises a single component, such as a touch screen, that functions as both a display 102 and a user input device 118 (see, e.g., FIG. 1B). In such embodiments, a touch screen and a touch pad may sense user interaction as well as the location of the interaction. One such embodiment comprises a capacitance-based touch screen/touch pad. In other embodiments, the system 100 may comprise both a touch screen and a touchpad. In further embodiments, user input device 118 may comprise buttons, joysticks, trackballs, scroll wheels, or any other user input device known to one having ordinary skill in the art. In still other embodiments, the system 100 may comprise a touch screen and/or a touch pad, plus another user input device such as those listed above.

Display 102 is configured to display output from the host processor 104 to the user. In one embodiment, display 102 comprises a liquid crystal display (LCD). In one such embodiment, wherein system 100 comprises a touch screen, the touch screen comprises a LCD disposed beneath a touch-sensing overlay user input device. In other embodiments, the touch screen comprises a single, integrated component, such as a touch-screen LCD. In some embodiments, the display 102 may comprise a stand-alone TV, computer monitor, or similar device connected to another device comprising a host processor 104.

The system 100 also comprises a haptic output device 114, which is in communication with haptic processor 108 and configured to output a haptic effect. The haptic processor 108 outputs a haptic signal to the haptic output device 114, which then outputs a haptic effect based on the haptic signal. For instance, the haptic processor 108 may output a haptic signal designed to cause the haptic output device 114 to vibrate. In some embodiments, in response to a haptic signal received from haptics processor 108, haptic output device 114 is configured to output a haptic effect varying a coefficient of friction of a touch surface. Additionally or alternatively, haptic output device 114 may provide vibrotactile haptic effects that move user input device 118 in a controlled manner.

In some embodiments, haptic output device 114 may be coupled to a housing of the user input device 118 (e.g. a touch pad, a touch screen, a keypad, etc.), and some haptic effects may use multiple haptic output devices in sequence and/or in concert. For example, in one embodiment the perceptible coefficient of friction can be varied by vibrating the surface at varying frequencies above a threshold. In another embodiment, different combinations/sequences of variance can be used to simulate the feeling of a texture.

Although a single haptic output device 114 is shown in FIG. 1, some embodiments may use multiple haptic output devices of the same or different type to vary the coefficient of friction of the touch surface. For example, in one embodiment, a piezoelectric haptic output device is used to displace some or all of a touch surface vertically and/or horizontally at ultrasonic frequencies, such as by using a haptic output device moving at frequencies greater than 20 kHz. In some embodiments, multiple haptic output devices such as eccentric rotating mass motors and linear resonant actuators can be used alone or in concert to provide different textures and other haptic effects. In another embodiment, haptic output device 114 may comprise an electrostatic actuator, or a haptic output device configured to modify the shape of a component of system 100.

In still other embodiments, haptic output device 114 may comprise a device configured to vary a vibration output by another motor in system 100. For example, haptic output device 114 may comprise an additional mass to be applied to the motor in order to vary the rotation of that motor and generate a vibration. In another embodiment, haptic output device 114 may comprise a device configured to vary a structural characteristic of a housing or a mount associated with the motor. This may vary the parasitic vibration in a way that is perceptible to the user of system 100.

Figure 2:
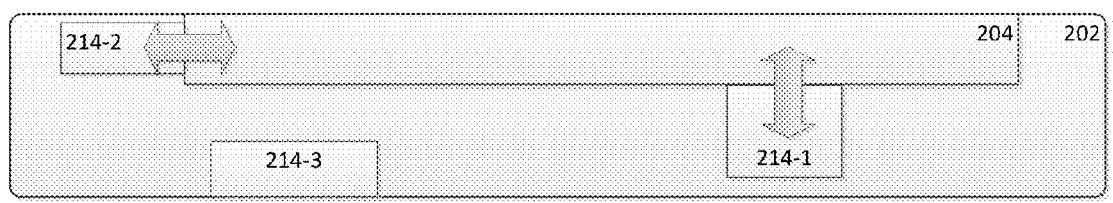
FIG. 2 is a block diagram of a touch-sensitive input device according to one embodiment of the present disclosure.

FIG. 2 shows a cross-sectional view of touch input device according to one embodiment of the present invention. Device 202 may be configured similarly to a touch screen, touch pad, or another touch sensitive input device. As can be seen in FIG. 2, device 202 includes a plurality of haptic output devices 214. Haptic output devices 214-1 may comprise a haptic output device configured to impart vertical force to a touch surface 204, while 214-2 may move the touch surface 204 laterally. In this example, the haptic output devices are coupled directly to the display/pad, but it should be understood that the haptic output devices can be coupled in any manner known to one having ordinary skill in the art being capable to transmit the haptic effects to the touch surface 204. Another haptic output device 214-3 may be coupled to a housing containing the components of device 202.

In one embodiment, haptic output devices 214-1 and 214-2 each comprise a piezoelectric haptic output device, while additional haptic output device 214-3 comprises an eccentric rotating mass motor, a linear resonant haptic output device, or another piezoelectric haptic output device. Haptic output device 214-3 can be configured to provide a vibrotactile haptic effect in response to a haptic signal from the processor. The vibrotactile haptic effect can be utilized in conjunction with surface-based haptic effects and/or for other purposes.

In some embodiments, either or both haptic output devices 214-1 and 214-2 can comprise a haptic output device such as a piezoelectric haptic output device. In another embodiment, haptic output devices 214-1 and 214-2 may comprise an electromagnetic haptic output device, an electroactive polymer, a shape memory alloy, a flexible composite piezo haptic output device (e.g. an haptic output device comprising a flexible material), electrostatic, and/or magnetostrictive haptic output devices, for example. Additionally, a single haptic output device 214-3 is shown, although multiple other haptic output devices can be coupled to the housing of device 202 and/or other haptic output devices 214-3 may be coupled elsewhere. Device 202 may feature multiple haptic output devices 218-1/218-2 coupled to the touch surface at different locations, as well.

A user may interact with touch input device 202. In response to the user interaction, one or more of the haptic output devices 214-1/214-2 may output a haptic effect. However, in some embodiments, the touch input device 202 may be used in an area comprising significant parasitic vibrations. In such an embodiment, the haptic effect may be tuned to be perceptible despite the parasitic vibrations. Thus, in some embodiments, when the device is in an area associated with parasitic vibrations, the haptic effect may comprise a non-vibration based effect, e.g. an electrostatic based effect, a skin stretch effect, or a surface deformation effect. In other embodiments, when the device is no longer in an area associated with parasitic vibrations, the haptic effect may comprise a vibration based effect.

While FIG. 1A and FIG. 1B depict a system 100 comprising various components, the present disclosure does not require that all of the components are encompassed within a single device. For example, in one embodiment, a TV comprises display 102, host processor 104, and memory 110. In one such embodiment, a separate remote input device, such as a remote control, that is configured to communicate with the TV over a known communications medium, such as infrared, RF, or another wireless connection, comprises input processor 106, memory 112, haptics processor 108, memory 116, input device 118, and haptic output device 114. In such an embodiment, the host processor 104 communicates with input processor 106 over the communication medium. The present disclosure further contemplates a single remote input device comprising input processor 106, memory 112, haptics processor 108, memory 116, input device 118, and haptic output device 114, in communication with multiple devices, each comprising a host processor 104 and memory 110. For example, the single remote input device may be a universal remote control that is in communication with a TV, an A/V receiver, and a DVD player with Internet applications. Conversely, a single device comprising a host processor 104 may be in communication with multiple remote input devices (e.g. a gaming console with multiple game controllers and a standard remote control).

Figure 3:
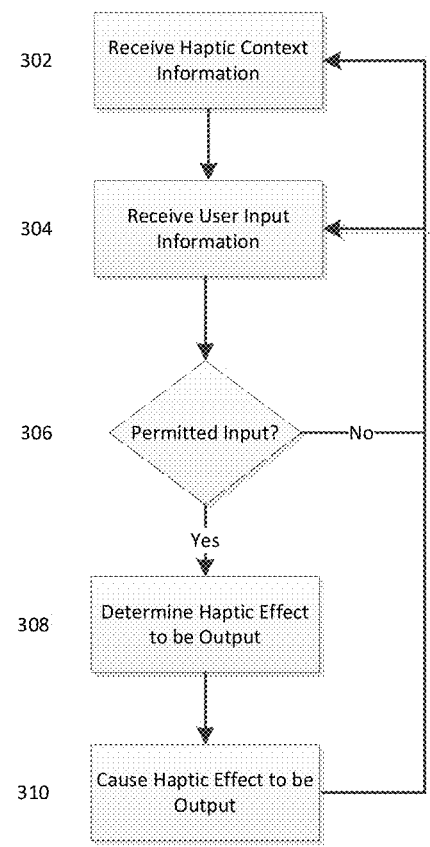
FIG. 3 is a flow diagram illustrating a method for determining haptic feedback effects based on haptic context information according to one embodiment of the present disclosure.

Illustrative Methods for Providing Haptic Effects Based on Haptic Context Information FIG. 3 is a flowchart of steps for determining haptic feedback effects based on haptic context information according to one embodiment of the present invention. In particular, FIG. 3 shows steps performed by a system to provide haptic effects based on haptic context information provided by a host processor. In some embodiments, the steps of FIG. 3 may be implemented by a group of processors. To aid in understanding how each of the steps may be performed, the following description is provided in the context of the illustrative block diagrams of the system shown in FIGS. 1A and 1B. However, embodiments according to the present disclosure may be implemented in alternative embodiments.

Beginning at step 302, haptic context information corresponding to a displayed GUI screen is received from host processor 104. In one embodiment, input processor 106 receives the haptic context information and stores it in memory 112. In another embodiment, haptics processor 108 receives the haptic context information and stores it in memory 116. The haptic context information comprises information defining active input controls for physical buttons and similar input devices 118 and/or active input areas for touch pads and touch screens. Active input controls are the controls of a user input device 118 that can be used to interact with a displayed GUI screen. Active input areas are defined areas on a touch sensitive input device that are available for the user to interact with a displayed GUI screen.

Figure 4:
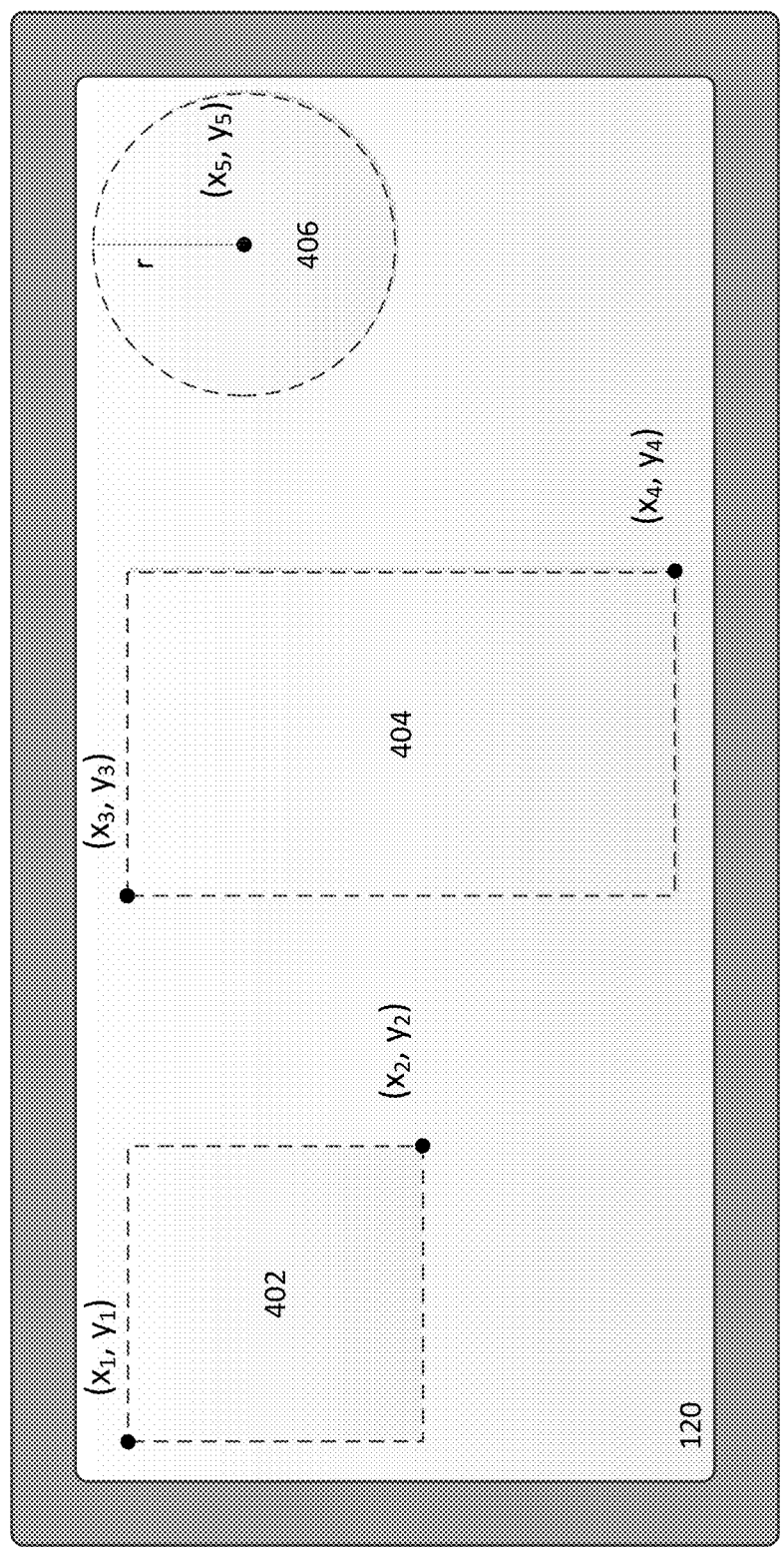
FIG. 4 illustrates active input areas on a touch screen according to one embodiment of the present disclosure.

FIG. 4 shows active input areas on a touch screen according to one embodiment of the present disclosure. In one embodiment, as illustrated by square active input area 402 having coordinates $(x_1, y_1)$ and $(x_2, y_2)$ and rectangular active input area 404 having coordinates $(x_3, y_3)$ and $(x_4, y_4)$ present on touch screen 120, haptic context information may include coordinates defining borders of an active input area on a touch sensitive input device. In another embodiment, haptic context information may include coordinates and shape information to define each active input area. For example, as illustrated by circle 406 having coordinates $(x_5, y_5)$ and a radius r present on touch screen 120, the haptic context information may define an active input area as a circle providing only coordinates for the center point and a radius.

In another embodiment, haptic context information further comprises permitted input information identifying one or more permitted types of user input per defined active input area. Permitted types of user input may be any touch gesture that a user can input using a touch sensitive input device (e.g. tap, drag, zoom, etc.). In one embodiment, haptic context information comprises permitted input information for each defined active input area. In yet another embodiment, haptic context information comprises permitted input information for a subset of the defined active input areas. In one such embodiment, active input areas without corresponding permitted input information are treated as permitting only a common default input type (e.g. a tap).

In one embodiment, the haptic context information further comprises haptic effect identification information that identifies haptic effects for output in response to user input. In such an embodiment, the haptic effect identification information may associate one haptic effect per active input control/active input area. For example, a first haptic effect may be associated with a first active input area, such as a button, a second haptic effect may be associated with a second active input area, such as a map, and a third haptic effect may be associated with a third active input area, such as scroll bar for scrolling through a list of nearby places of interest.

In another embodiment, haptic effect identification information may associate haptic effects with each permitted input type per active input area. For example, in a mapping application having a first active input area showing a map, a first haptic effect may be associated with a finger drag input applied to the first active input area (e.g. to move the map in a direction to cause a new area to be displayed) and a second haptic effect may be associated with a zoom input also applied to first active input area. The haptic effect identification information may identify haptic effects in any manner known to one having ordinary skill in the art. In one embodiment, the memory 116 in communication with processor 108 comprises an indexed library of haptic effect definitions. In this embodiment, the haptic effect identification information may identify haptic effects by their respective indexes. In another embodiment, haptic effect identification information may comprise parameters to define haptic effects (e.g. where the haptic output device comprises an eccentric rotating mass haptic output device, parameters may be duration, intensity, and/or an intensity pattern).

The association of haptic effects may comprise any number of techniques known to those having skill in the art. For example, in one embodiment illustrated by FIG. 5A, the structure for every active input control and permitted input type per active input area comprises a haptic effect identification information field or structure. In this embodiment, if the same haptic effect is associated with two active input controls or permitted input types per active input area, multiple haptic effect identification information fields or structures will contain identical data. In another embodiment, illustrated by FIG. 5B, the haptic context information contains only one instance of a haptic effect identification information structure for each haptic effect. In such an embodiment, each unique haptic effect identification information structure comprises a structure defining the active input controls and permitted input types per active control area associated with the haptic effect. Since each active input control and each permitted input types per active control area are associated with a single haptic effect, redundancy of data is reduced in this embodiment.

Returning now to FIG. 3, at step 304 user input information is received. User input information comprises user inputs to a user input device 118. For example, user input information may indicate the pressing of a button, scrolling of a scroll wheel, manipulation of a joystick, the performance of a touch gesture detected by a touch sensitive input device in a particular location, or any other input known to one having ordinary skill in the art. Furthermore, the format of the user input information may be any form known to one having ordinary skill in the art. In one embodiment, user input information is received by input processor 106 from one or more user input devices 118. In another embodiment, user input information is received by haptics processor 108 from input processor 106.

At decision point 306, the system 100 determines whether the user input described by the user input information is a permitted input based on the haptic context data provided by host processor 104. In one embodiment, user inputs described by the user input information, other than touch inputs received by a touch sensitive input device, are checked against the list of active input controls defined in the haptic context data. If the user input is a valid active input control, the method proceeds to step 308. If the user input is not a valid active input control, the method may return to step 302 or 304. The method returns to step 302 if new haptic context information is provided (indicating a new GUI screen is displayed). The method returns to step 304 if a user again interacts with a currently displayed GUI causing new user input information to be received prior to the receipt of new haptic context information.

In the event that the user input information describes a touch input, the system 100 may first check the location of the touch input against the list of active input areas provided by in the haptic context information. If the location of the touch input is within an active input area, the system 100 may then check to see if the input type is a permitted input type based on the haptic context information. If the user input is a permitted input type, then the method proceeds to step 308. However, if the touch input is located outside of an active input area or the user input is not a permitted in put type, the method returns to step 302 if new haptic context information is provided (indicating a new GUI screen is displayed) or the method returns to step 304 if new user input information is received prior to the receipt of new haptic context information.

At step 308, the system 100 determines a haptic effect to be output based on the user input information describing the user input and based on the haptic context information. As described above, the haptic context information comprises haptic effect identification information associated with active input controls, active input areas, and or permitted input types per active input area. In one embodiment, input processor 106 accesses the haptic context information stored in memory 112 to determine the appropriate haptic effect. In another embodiment, haptics processor 108 accesses the haptic context information stored in memory 116 to determine the appropriate haptic effect.

At step 310, the haptic effect determined at step 308 is output. In embodiments where input processor 106 determined the haptic effect, input processor 106 communicates the haptic effect identification information for the determined haptic effect from the haptic context information to the haptics processor 108, causing haptics processor 108 to communicate with haptic output device 114 to initiate playback. In one embodiment, haptic effect identification information provided by the input processor. 106 is an index to a library of haptic effect definitions stored in memory 112. In this embodiment, haptics processor 108 retrieves the haptic effect information required to output the haptic effect from memory 112 using the provided index. In another embodiment, haptic identification information provided by input processor 106 comprises a set of parameters defining a haptic effect. In this embodiment, the haptics processor 108 interprets the parameters and initiates playback of the haptic effect based on the parameters. In embodiments where haptics processor 108 determined the haptic effect, the haptics processor 108 retrieves the haptic effect index or parameters from the haptic effect identification information and then performs the steps attributed to it earlier in this paragraph. In each of these embodiments, after the host processor 104 provides the haptic context information for a GUI at the time it is displayed, the host processor is not involved in the real-time determination of haptic effects to be output in response to user input. Accordingly, latency involved in communicating user input information to a host processor 104 and waiting for a response from a host processor 104 specifying a haptic effect to be output may be eliminated. Upon completion of step 310, the method returns to step 302 if new haptic context information is provided (indicating a new GUI screen is displayed) or the method returns to step 304 if a user again interacts with a currently displayed GUI causing new user input information to be received prior to the receipt of new haptic context information.

GENERAL

The foregoing description of some embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention Reference herein to "one embodiment" or "an embodiment" means that a particular feature, structure, operation, or other characteristic described in connection with the embodiment may be included in at least one implementation of the invention. The invention is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

What is claimed:

1. A method comprising:
   receiving haptic context information associated with a graphical user interface displayed on a display, the haptic context information comprising boundaries defining a plurality of active input areas of the graphical user interface with which a user can interact via a user input device;
   receiving an input signal from the user input device associated with a user interaction with the graphical user interface;
   determining a haptic effect in response to the user interaction occurring within an active input area defined by the haptic context information;
   determining whether the user input device is positioned in an environment with parasitic vibrations;
   modifying a characteristic of the haptic effect in response to determining the user input device is positioned in the environment with parasitic vibrations; and
   outputting a haptic signal associated with the haptic effect.

2. The method of claim 1, wherein the user input device comprises one or more of: a button, a joystick, a scroll wheel, a touch screen, or a touch pad.

3. The method of claim 1, wherein the display and the user input device comprise a touch-screen display and the haptic context information defines one or more active input areas of the touch-screen display.

4. The method of claim 3, further comprising determining the active input area associated with the user interaction.

5. The method of claim 4, wherein the haptic context information comprises a lookup table mapping one or more types of permitted user interaction with each of the plurality of active input areas, and wherein the method further comprises determining whether the user interaction is of a permitted type for the active input area.

6. The method of claim 5, wherein the lookup table further comprises haptic effect identification information comprising one or more haptic effects mapped to with the one or more types of permitted user interaction.

7. The method of claim 1, wherein the boundaries comprise pixel coordinates defining an outer border for each of the a plurality of active input areas.

8. The method of claim 1, wherein the boundaries comprise a central pixel coordinate and a radius that combined define a circular active input area.

9. The method of claim 1, wherein whether the user input device is positioned in an environment with parasitic vibrations is determined based on information in a database, the information comprising a plurality of environments comprising parasitic vibrations.

10. The method of claim 1, wherein modifying the characteristic of the haptic effect comprises changing a type of the haptic effect from a vibrotactile haptic effect to a non-vibrotactile effect.

11. The method of claim 10, further comprising changing the characteristic of the haptic effect from the non-vibrotactile effect to the vibrotactile effect in response to determining that the user input device is not in the environment with parasitic vibrations.

12. The method of claim 11, wherein the non-vibrotactile effect comprises an electrostatic effect, a skin stretch effect, or a surface deformation effect.

13. A non-transitory computer readable medium comprising program code, which when executed by a processor is configured to cause the processor to:
   receive haptic context information associated with a graphical user interface displayed on a display, the haptic context information comprising boundaries defining a plurality of active input areas of the graphical user interface with which a user can interact via a user input device;
   receive an input signal from the user input device associated with a user interaction with the graphical user interface;
   determine a haptic effect in response to the user interaction occurring within an active input area defined by the haptic context information;
   determine whether the user input device is positioned in an environment with parasitic vibrations;
   modify a characteristic of the haptic effect in response to determining the user input device is positioned in the environment with parasitic vibrations; and
   output a haptic signal associated with the haptic effect.

14. The non-transitory computer readable medium of claim 13, wherein the user input device comprises one or more of: a button, a joystick, a scroll wheel, a touch screen, or a touch pad.

15. The non-transitory computer readable medium of claim 13, wherein the display and the user input device comprise a touch-screen display and the haptic context information defines one or more active input areas of the touch-screen display.

16. The non-transitory computer readable medium of claim 15, further comprising program code, which when executed by a processor is configured to cause the processor to determine the active input area associated with the user interaction.

17. The non-transitory computer readable medium of claim 16, wherein the haptic context information comprises a lookup table mapping one or more types of permitted user interaction with each of the plurality of active input areas, and wherein the non-transient computer readable medium further comprises program code configured to cause the processor to determine whether the user interaction is of a permitted type for the active input area.

18. The non-transitory computer readable medium of claim 17, wherein the lookup table further comprises haptic effect identification information comprising one or more haptic effects mapped to with the one or more types of permitted user interaction.

19. A system, comprising:
   a haptic output device configured to receive a haptic signal and output a haptic effect;
   a display configured to display a graphical user interface;
   a user input device configured to detect a user interaction and transmit an input signal associated with the user interaction; and
   a processor in communication with the haptic output device and the user input device, the processor configured to:
   receive haptic context information associated with the graphical user interface, the haptic context information comprising boundaries defining a plurality of active input areas of the graphical user interface with which a user can interact via the user input device;
   receive the input signal associated with the user interaction with the user input device;
   determine a haptic effect in response to the user interaction being associated with an active input area defined by the haptic context information;
   determine whether the user input device is positioned in an environment with parasitic vibrations;
   modify a characteristic of the haptic effect in response to determining the user input device is positioned in the environment with parasitic vibrations; and output a haptic signal associated with the haptic effect to the haptic output device.

20. The system of claim 19, wherein the display and the user input device comprise a touch-screen display and the haptic context information defines one or more active input areas of the touch-screen display.

21. The system of claim 20, wherein the processor is further configured to determine the active input area associated with the user interaction.

22. The system of claim 21, wherein the haptic context information comprises a lookup table mapping one or more types of permitted user interaction with each of the plurality of active input areas, and the processor is further configured to determine whether the user interaction is of a permitted type for the active input area.

23. The system of claim 22, wherein the lookup table further comprises haptic effect identification information comprising one or more haptic effects mapped to the one or more types of permitted user interaction.

24. The system of claim 19, wherein the processor is a haptics processor, and further comprising a separate host processor in communication with the display, the separate host processor configured to:
  receive data associated with the user interaction from a separate input processor;
  determine the haptic context information based on one or more characteristics of the graphical user interface, the data associated with the user interaction, or both; and
  transmit the haptic context information to the haptics processor.

* * * * *